(12) United States Patent
Hurry et al.

(10) Patent No.: US 10,909,266 B2
(45) Date of Patent: *Feb. 2, 2021

(54) ADAPTIVE MODEL FOR DATABASE SECURITY AND PROCESSING

(71) Applicant: Merck Sharp & Dohme Corp., Whitehouse Station, NJ (US)

(72) Inventors: David B. Hurry, Mount Airy, MD (US); David J. Tabacco, Phillipsburg, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/792,539

(22) Filed: Oct. 24, 2017

(65) Prior Publication Data
US 2019/0122006 A1    Apr. 25, 2019

(51) Int. Cl.
| G06F 21/62 | (2013.01) |
| G06F 21/44 | (2013.01) |
| G06F 16/176 | (2019.01) |
| G06F 16/2452 | (2019.01) |
| H04W 12/08 | (2009.01) |

(Continued)

(52) U.S. Cl.
CPC ...... *G06F 21/6281* (2013.01); *G06F 16/1774* (2019.01); *G06F 16/24524* (2019.01); *G06F 21/44* (2013.01); *G06F 21/6227* (2013.01); *H04L 63/107* (2013.01); *H04W 12/08* (2013.01); *H04W 12/06* (2013.01)

(58) Field of Classification Search
CPC .. G06F 21/6281; G06F 21/44; G06F 16/1774; G06F 16/24524; H04L 63/107; H04W 12/08; H04W 12/06
USPC .......................................................... 726/27
See application file for complete search history.

(56) References Cited

U.S. PATENT DOCUMENTS 5,983,214 A * 11/1999 Lang ...................... G06F 16/337
6,425,012 B1 * 7/2002 Trovato .............. H04L 12/1818
                                                      348/E7.071

(Continued)

OTHER PUBLICATIONS

PCT International Search Report and Written Opinion, PCT Application No. PCT/US2018/050312, dated Nov. 19, 2018, 17 pages.

*Primary Examiner* — Kambiz Zand
*Assistant Examiner* — Mahabub S Ahmed
(74) *Attorney, Agent, or Firm* — Fenwick & West LLP

(57) ABSTRACT

A security system determines authorizations for entities to access data objects. The security system may train an adaptive model to predict the intent of a user who provides authorization for various entities or other users. In an embodiment, the adaptive model may be configured to determine latent properties of training data by identifying common parameters between entities that are, or are not, permitted to access given data object(s). The training data may include previous authorizations provided to the entities. Based on the identified common parameters, the model may generate usage expressions for determining a likelihood that the user intends to provide authorization for a given entity to access the given data object. If the likelihood is greater than a threshold value, the security system may provide a recommendation to the user to provide the authorization for the given entity.

19 Claims, 7 Drawing Sheets

(51) Int. Cl.
*H04L 29/06* (2006.01)
*H04W 12/06* (2009.01)

(56) References Cited

U.S. PATENT DOCUMENTS

| | | | | |
|---|---|---|---|---|
| 7,024,693 B2* | 4/2006 | Byrne | H04L 61/1523 | 726/21 |
| 7,650,644 B2* | 1/2010 | Cheng | G06F 21/6218 | 726/27 |
| 8,397,287 B2* | 3/2013 | Mullick | H04L 63/105 | 726/15 |
| 8,635,464 B2* | 1/2014 | Yacobi | H04L 9/088 | 713/193 |
| 8,843,754 B2* | 9/2014 | Alward | G06F 21/316 | 713/182 |
| 8,965,340 B1* | 2/2015 | Biger-Levin | H04L 63/0876 | 455/411 |
| 9,135,291 B2* | 9/2015 | Assam | G06Q 50/01 | |
| 9,230,066 B1* | 1/2016 | Bailey | H04W 12/06 | |
| 9,405,897 B1* | 8/2016 | Bailey | G06F 21/316 | |
| 2002/0026577 A1* | 2/2002 | Futamura | H04L 9/3273 | 713/156 |
| 2003/0225833 A1* | 12/2003 | Pilat | G06Q 10/107 | 709/204 |
| 2004/0085186 A1* | 5/2004 | Eveland | G06F 19/328 | 340/5.8 |
| 2007/0136291 A1* | 6/2007 | Bird | G06F 21/6227 | |
| 2008/0055395 A1* | 3/2008 | Mock | H04N 21/41407 | 348/14.01 |
| 2008/0168530 A1* | 7/2008 | Kuehr-McLaren | G06F 21/6218 | 726/1 |
| 2008/0306883 A1* | 12/2008 | Baffier | G06F 11/1446 | 705/400 |
| 2009/0046677 A1* | 2/2009 | Toledano | H04L 67/28 | 370/338 |
| 2009/0144774 A1* | 6/2009 | Georgis | H04N 7/163 | 725/44 |
| 2009/0189736 A1* | 7/2009 | Hayashi | G06F 21/32 | 340/5.81 |
| 2009/0216859 A1* | 8/2009 | Dolling | H04L 63/126 | 709/218 |
| 2010/0217657 A1* | 8/2010 | Gazdzinski | G10L 25/48 | 705/14.5 |
| 2012/0047150 A1* | 2/2012 | Spiegel | G06F 16/285 | 707/748 |
| 2012/0323909 A1* | 12/2012 | Behforooz | G06F 16/24578 | 707/728 |
| 2013/0081105 A1* | 3/2013 | Giambiagi | G06F 21/31 | 726/1 |
| 2013/0312066 A1* | 11/2013 | Suarez | G16H 40/63 | 726/4 |
| 2013/0347055 A1* | 12/2013 | Motoyama | G06F 21/60 | 726/1 |
| 2014/0122471 A1* | 5/2014 | Houston | G06F 16/958 | 707/731 |
| 2014/0250117 A1* | 9/2014 | Behforooz | G06F 16/24578 | 707/728 |
| 2014/0282586 A1* | 9/2014 | Shear | G06F 16/248 | 718/104 |
| 2014/0289833 A1* | 9/2014 | Briceno | H04L 63/08 | 726/7 |
| 2014/0359692 A1* | 12/2014 | Chari | H04L 63/20 | 726/1 |
| 2015/0046711 A1* | 2/2015 | Slaby | H04W 12/0609 | 713/170 |
| 2015/0088676 A1* | 3/2015 | Elliott | G06Q 20/29 | 705/21 |
| 2015/0089569 A1* | 3/2015 | Sondhi | H04L 63/0807 | 726/1 |
| 2015/0089673 A1* | 3/2015 | Beckman | G06F 21/10 | 726/29 |
| 2015/0135261 A1* | 5/2015 | Park | H04L 63/102 | 726/1 |
| 2015/0256973 A1* | 9/2015 | Raounak | H04L 67/22 | 726/7 |
| 2015/0281252 A1* | 10/2015 | Melcher | G06Q 30/0631 | 726/4 |
| 2016/0035215 A1* | 2/2016 | Obaidi | G08B 27/006 | 340/286.02 |
| 2017/0006009 A1* | 1/2017 | Hessler | G06Q 20/40 | |
| 2017/0011195 A1* | 1/2017 | Arshad | G06F 16/29 | |
| 2017/0093871 A1* | 3/2017 | Abuelsaad | H04L 63/104 | |
| 2017/0126662 A1* | 5/2017 | Sreedhar | H04L 63/0815 | |
| 2017/0250853 A1* | 8/2017 | Evans | H04W 4/60 | |
| 2018/0013560 A1* | 1/2018 | He | H04L 67/10 | |
| 2018/0018590 A1* | 1/2018 | Szeto | G06F 21/6254 | |
| 2018/0041492 A1* | 2/2018 | Jacobs | H04L 67/22 | |
| 2018/0083940 A1* | 3/2018 | Pranam | H04L 63/0815 | |
| 2018/0102906 A1* | 4/2018 | Lindberg | H04L 63/0853 | |
| 2018/0337927 A1* | 11/2018 | Carnahan | H04L 41/044 | |
| 2018/0375925 A1* | 12/2018 | Xu | H04L 67/10 | |
| 2019/0005113 A1* | 1/2019 | Kenedy | G06F 16/2237 | |
| 2019/0036975 A1* | 1/2019 | Beckman | G06F 21/6218 | |
| 2019/0258818 A1* | 8/2019 | Yu | G06F 21/6245 | |
| 2019/0361845 A1* | 11/2019 | Faith | G06F 16/9536 | |

* cited by examiner

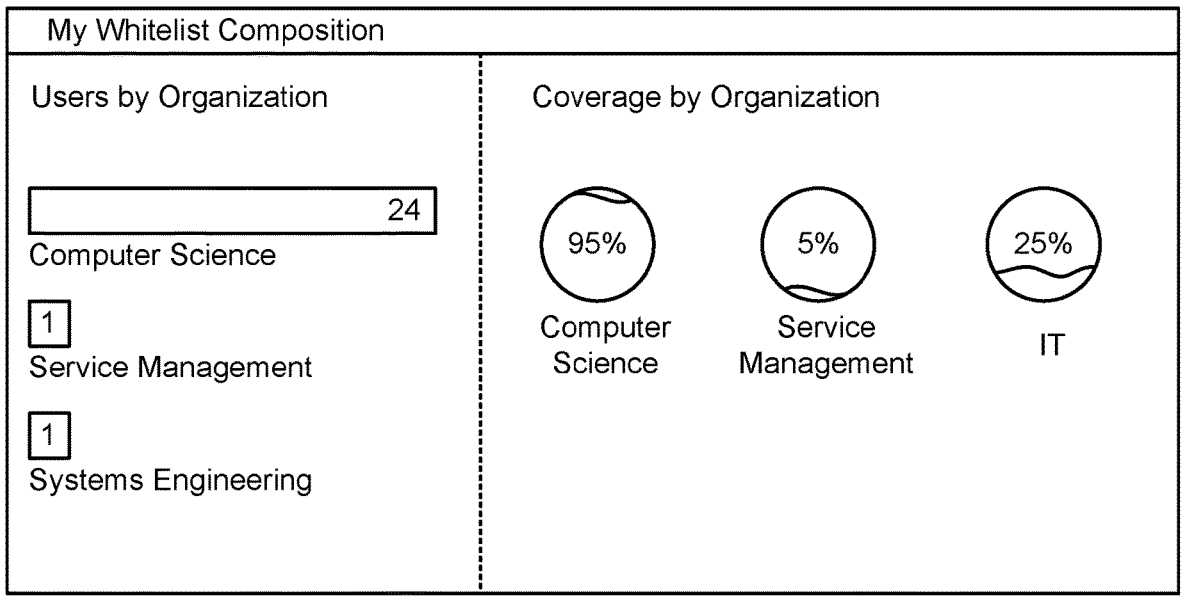

400

```
┌─────────────────────────────────────────────┐
│ Receive input data from a client device of a user to provide │
│ authorization to entities to access a data object │
│ 402 │
└─────────────────────────────────────────────┘
                      │
                      ▼
┌─────────────────────────────────────────────┐
│ Update an authorization database record to authorize the entities to │
│ access the data object │
│ 404 │
└─────────────────────────────────────────────┘
                      │
                      ▼
┌─────────────────────────────────────────────┐
│ Generate parameters describing the entities │
│ 406 │
└─────────────────────────────────────────────┘
                      │
                      ▼
┌─────────────────────────────────────────────┐
│ Transmit the parameters to a model to determine a likelihood that the │
│ user intends to provide authorization to a given entity to access the │
│ data object │
│ 408 │
└─────────────────────────────────────────────┘
                      │
                      ▼
┌─────────────────────────────────────────────┐
│ Transmitting a recommendation responsive to determining that the │
│ likelihood is greater than a threshold value │
│ 410 │
└─────────────────────────────────────────────┘
```

FIG. 4

ADAPTIVE MODEL FOR DATABASE SECURITY AND PROCESSING

TECHNICAL FIELD

The disclosure is related to the field of database security and processing.

BACKGROUND

Existing access control models to protect data are user-centric and do not consider additional context describing the data or the users. These types of access control models include, for example, mandatory access control (MAC), discretionary access control (DAC), mandatory integrity control, and role-based access control (RBAC). Attribute-based access control (ABAC) models define access control based on combining attributes, e.g., user attributes, resource attributes, or environment attributes. However, these models are limited in practical use by the combinatorial growth of user roles, complexity of determining and assessing the results of combinations of attributes, as well as performance demands and complexity of data processes at large scale. The technical challenges of combining disparate data across sources are barriers to efficient data management operations and broader discovery of new research opportunities.

Traditionally, applying security policies across multiple technologies is difficult because data owners need to coordinate encoding of rules for each of different technology for runtime enforcement. The rules are often communicated informally and ad-hoc through instructions that are disconnected from the data, which increases the risk of both inappropriate use and over-caution by users. As a result, sensitive data may be improperly exposed and other high value data be become underused due to restricted access. It is desirable to maintain an up-to-date environment that includes many types of data sets and approved uses.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 3A-3B illustrate example user interface layouts corresponding to generated user interfaces in response to application of change corresponding to data security through the adaptive model in accordance with various embodiments.

FIG. 4 illustrates a process flow to determine authorization to access data for additional entities through the adaptive model in accordance with one embodiment.

Figure 1A:
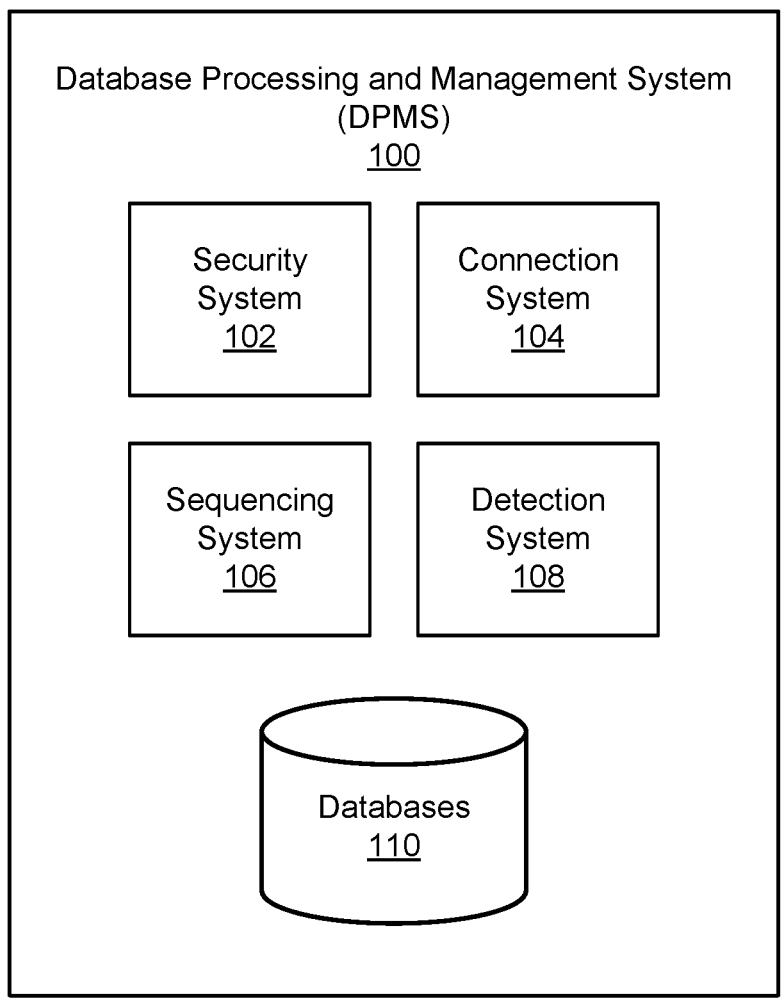
FIG. 1A illustrates an example database processing and management system (DPMS) in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an adaptive model that predicts the intent of a user who provides authorization for various entities (or users) to access data objects. The adaptive model, which may also be referred to herein as a "model," predicts intents though a user account corresponding to the user. The adaptive model may be initially trained based on authorizations manually input by the user via the user account on a client device, for example, using a user interface on a computer. A security system (or security server) updates a record of an authorizations database to authorize entities to access data objects according to the authorizations. The data objects may correspond to individual fields of data within one or more databases.

The adaptive model may be configured to determine latent properties of the training data by identifying common parameters between entities that are, or are not, permitted to access a given data object. Based on the identified common parameters, the model generates a set of expressions for determining a likelihood that a user intends to provide authorization for a given entity to access the given data object. An expression may also be referred to herein as a "usage expression." If the likelihood is greater than a threshold value (e.g., indicating a confident prediction of the user's intent), the security system may provide a recommendation to the user to provide the authorization for the given entity.

The security system may receive input data indicating whether the user accepts or rejects the recommended authorization, and the input data may be used as feedback to retrain the model by updating the set of expressions. Moreover, responsive to receiving an acceptance of the recommendation (indicating a correct prediction by the model), the security system updates the authorizations database to authorize the given entity to access the given data object. In some embodiments, the security system may permeate the set of expressions by predicting other data objects to which the given entity should have authorization to access, or by recommending to provide authorizations to access the given data object to additional users having similar parameters as the given entity.

In some use cases, the model can also be trained based on parameters describing data objects or users providing authorizations. For instance, a parameter indicates a level of reliability of a particular user, who may be a trusted authority such as a data owner or database administrator. The security system may monitor changes in parameters describing entities to provide a dynamic layer of security by updating the authorizations database without necessarily requiring manual input (or requiring limited manual input, e.g., accepting recommended authorizations). In one use case, an expression generated by the model learns that entities within a geographic domain (e.g., an office building that may be detected by a location detection system) are authorized to access a particular data object. The security system may detect that an entity (e.g., an employee) initially in the geographic domain leaves the geographic domain, for example, based on an internet protocol (IP) address or global positioning system (GPS) sensor data received from a client device of the entity. Responsive to this detection, the security system may remove an authorization element that results in access being restricted for the entity to access the particular data object, at least until the entity has returned to the geographic domain.

Access control of data objects is especially relevant in healthcare and life science research due to the many dimensions of operational use of data that over time may be communicated to multiple types of entities and systems, as well as transferred between various systems holding copies of the data for different uses. However, it should be noted that the embodiments described herein may be applicable to various other fields of use, data security applications, or database processing and management in general.

The disclosed embodiments of the security system provide a technical solution to a challenge unique to computing environments for database processing and management. Conventional systems face technical issues in standardizing security policies across multiple technologies for encoding rules or enforcement. The technical solution disclosed herein addresses these issues by using the adaptive model to process heterogeneous sources of rules of use (e.g., usage expressions) and ensure that security protocols of data objects are kept up-to-date. In some embodiments, the security system uses the adaptive model to automatically update a database (e.g., to add, remove, or modify authorizations for entities to interact with data objects) without necessarily requiring manual input, or with reduced manual input. By determining dynamic rules of use for data objects instead of managing static permissions from file-to-file, the security system provides more granular control and also reduces the amount of computational resources required to secure data in a computing environment.

System Overview

FIG. 1A illustrates an example database processing and management system (DPMS) in accordance with one embodiment. The DPMS 100 includes a security system 102, connection system 104, sequencing system 106, detection system 108, and one or more databases 110. Alternative embodiments may include different or additional modules or omit one or more of the illustrated modules.

The security system 102 determines and updates authorizations for users to perform various types of interactions with data objects. The data objects may be stored in one or more of the databases 110 of the DPMS 100 or stored in other databases or systems outside of the DPMS 100. For purposes of explanation, the following description generally refers to the "access" interaction. However, it should be noted that interactions with data objects may include other types of interactions such as viewing, editing, moving, sharing, copying, etc. Data objects may include various types of information including, for example, experimental data (e.g., molecular compounds, lab procedures, or scientific findings), intellectual property (e.g., patents or trade secrets), contracts (e.g., terms of use for licensed data), regulatory requirements (e.g., for scientific and financial filings with a government organization), sensitive information (e.g., patient information, health records, or human resources data), information technology controls (e.g., usernames, passwords, or other security credentials), among other types of information. A data object may have any suitable format for representing data. For instance, a data object represents a table, a table row, a table column, a certain field of a data entry of a table, or any number or combination of the above.

In some embodiments, the security system 102 may operate in conjunction with one or more other subsystems of the DPMS 100. The connection system 104 determines connections between data objects. In one use case, responsive to determining that multiple databases include related information (e.g., medical data from a hospital, a government agency, and a third party system), the connection system 104 may join or generate a union between data objects stored in the databases. The sequencing system 106 may perform sequence transformations on data objects. For example, the sequencing system 106 determines a sequence of temporal events and durations of time between temporal events (e.g., duration between a symptoms and a disease diagnosis). The detection system 108 may classify data objects of the DPMS 100. In some embodiments, the detection system 108 assumes that data objects are self-expressive and determines the classifications based on contents of the data objects, e.g., rather than on labels of the data objects because the labels may vary between data sources from different systems.

Figure 1B:
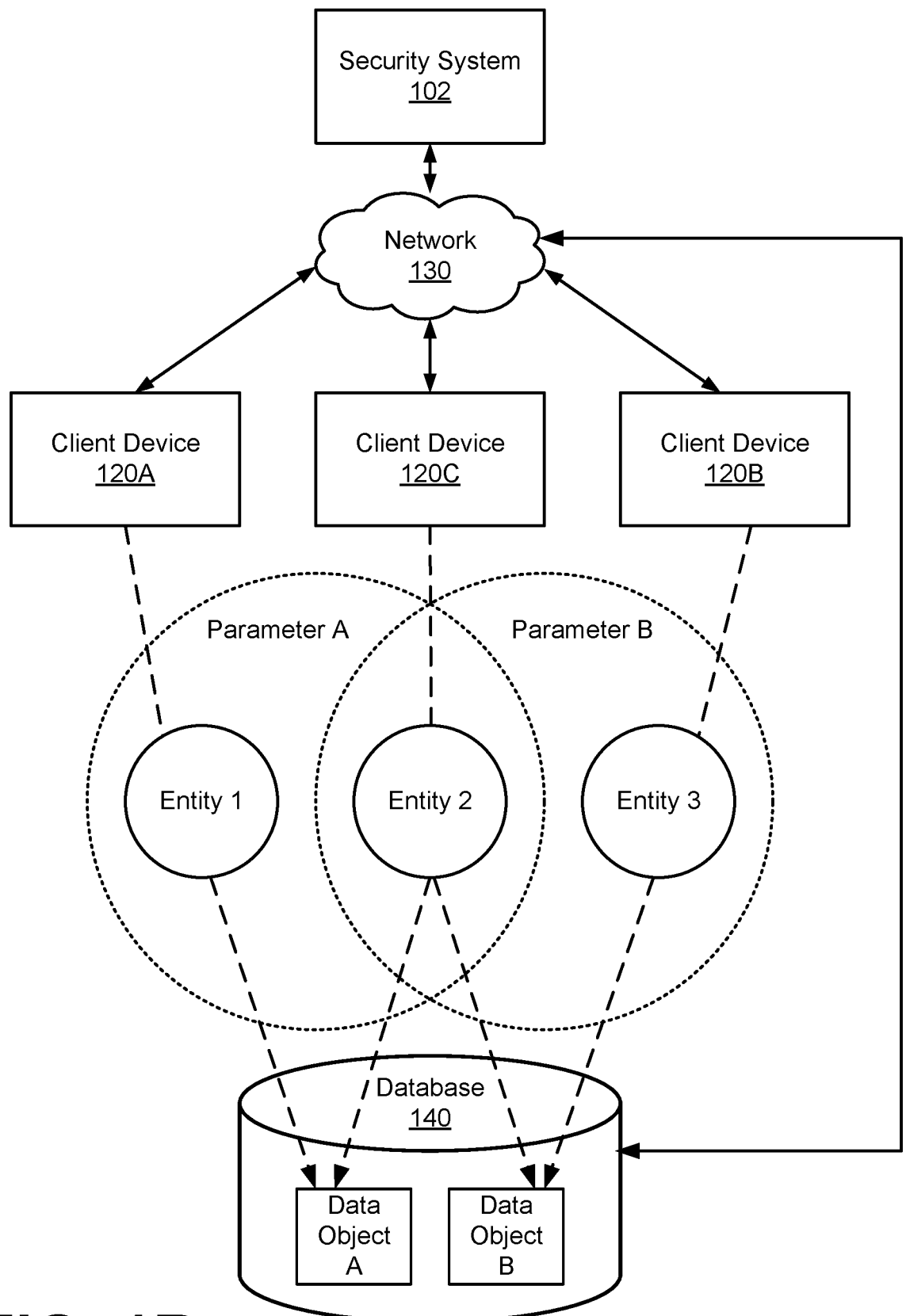
FIG. 1B illustrates an example system environment for a security system in accordance with one embodiment.

FIG. 1B illustrates an example system environment for a security system 102 in accordance with one embodiment. The system environment shown in FIG. 1B includes the security system 102 and one or more client devices 120 of entities of the security system 102, for example, client devices 120A, 120B, and 120C (which may collectively be referred to herein as a "client device 120" or "client devices 120") of entity 1, entity 2, and entity 3, respectively. The security system 102 and client devices 120 are connected to each other via a network 130. In other embodiments, different or additional entities can be included in the system environment. The functions performed by the various entities of FIG. 1 may vary in different embodiments.

Each client device 120 comprises one or more computing devices capable of processing data as well as transmitting and receiving data a network 130. For example, a client device 120 may be a desktop computer, a laptop computer, a mobile phone, a tablet computing device, an Internet of Things (IoT) device, or any other device having computing and data communication capabilities. Each client device 120 includes a processor for manipulating and processing data, and a storage medium for storing data and program instructions associated with various applications. The storage medium may include both volatile memory (e.g., random access memory) and non-volatile storage memory such as hard disks, flash memory, and external memory storage devices. In an embodiment, a client application executing on the client device 120 can determine the location of the client device 120 using one or more sensors of the client device 120, such as a GPS receiver, and provide the location to the security system 102. In some embodiments, the client device 120 can determine and provide other types of telematics data (e.g., type of network connection, IP address, or identification information) to the security system 102.

The network 130 may comprise any combination of local area and wide area networks employing wired or wireless communication links. In one embodiment, network 130 uses standard communications technologies and protocols. For example, network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

In the example embodiment shown in FIG. 1B, the security system 102 manages authorizations for the entities to interact with data objects of the database 140. In one embodiment, the security system 102 receives a first user input to provide authorization for entity 1 to access data object A and a second user input to provide authorization for entity 3 to access data object B. A user such as a data owner or database administrator may provide the user inputs to the security system 102 via a graphical user interface of a client application executing on a client device 120 (further described with reference to FIGS. 3A-B). The security system 102 uses an adaptive model to determine a likelihood that the user intends to provide entity 2 access to data objects A and B based on the user inputs. In particular, the security system 102 may parameterize entities and generate common parameters describing multiple entities. For instance, the adaptive model determines the likelihood of the user's intent based on whether entity 3 has a common parameter with entities 1 and 2. Responsive to determining that the likelihood is greater than a threshold value, the security system 102 may provide a recommendation to the user to provide entity 3 with access to data objects A and B.

In an example use case, the security system 102 generates parameter A indicating that entity 1 is a scientist of a research lab, e.g., based on a work address or employee identification information of entity 1. Additionally, the security system 102 also determines parameter B indicating that entity 3 is a doctor of a hospital. Using parameters A and B, the adaptive model generates a common parameter indicating that the scientist and doctor are both participating in a joint case study of a disease. For example, the adaptive model may determine that the research lab is located within a threshold distance from the hospital, that the scientist and doctor (or members of their respective teams) have frequently contact each other during a recent period of time to share data objects relevant to the study, or that the research lab and hospital have previously conducted joint studies. Moreover, the adaptive model may also generate the common parameter by analyzing data objects A and B, e.g., which both include experimental data or research logs for the same study of the disease. For instance, the security system 102 parses the contents of the data objects to perform a semantic analysis for keywords or metadata. Based on the common parameter, the adaptive model may generate or update a usage expression to represent entities that have authorization to perform certain actions on a given data object. For instance, the usage expression is: [["employee of the research lab" OR "employee of the hospital"] AND "member of the joint case study"].

Following in the same example, the adaptive model may identify additional entities that are likely to also be part of the joint case study, but that have not yet been provided with authorization to access the data objects. For instance, entity 2 is a group of lab technicians of the research lab who work with the scientist and also receive experimental data (e.g., relevant to the disease of the study) from the doctor. Thus, the adaptive model may determine a high likelihood that the lab technicians are part of the joint case study. As a result, the security system 102 may present a data owner with a recommendation to provide entity 2 with access to data objects A and/or B. By automatically identifying additional entities without manual input by the data owner (or database administrator), the security system 102 facilitates appropriate sharing of data objects and without oversharing to unauthorized entities. Accordingly, by allowing the lab technicians, scientist, and doctor to access the relevant data objects to conduct the joint case study, the different entities may be able to collaborate to discover findings from their research more efficiently and quickly. In contrast, in existing systems, the entities may have to wait for extended periods of time for a data owner or database administrator to manually input a request to grant authorization to access the relevant data objects for the joint case study. Moreover, in non-technology environments, the data typically cannot be distributed in a timely manner due to issues such as determining who should have access to the data and/or when that access should be made available. This may be particularly important where speed of data distribution is a critical factor (e.g., treatment or diagnosis required within a small time window).

In some example embodiments, the entities (e.g., an access cohort) approved manually by a user or under a usage expression to access a data object is a small subset of a global population of entities for which the security system 102 has stored information. As such, the security system 102 may increase or maximize the opportunity for other entities of the global population to be considered for including in the access cohort.

Example System Architecture

Figure 2:
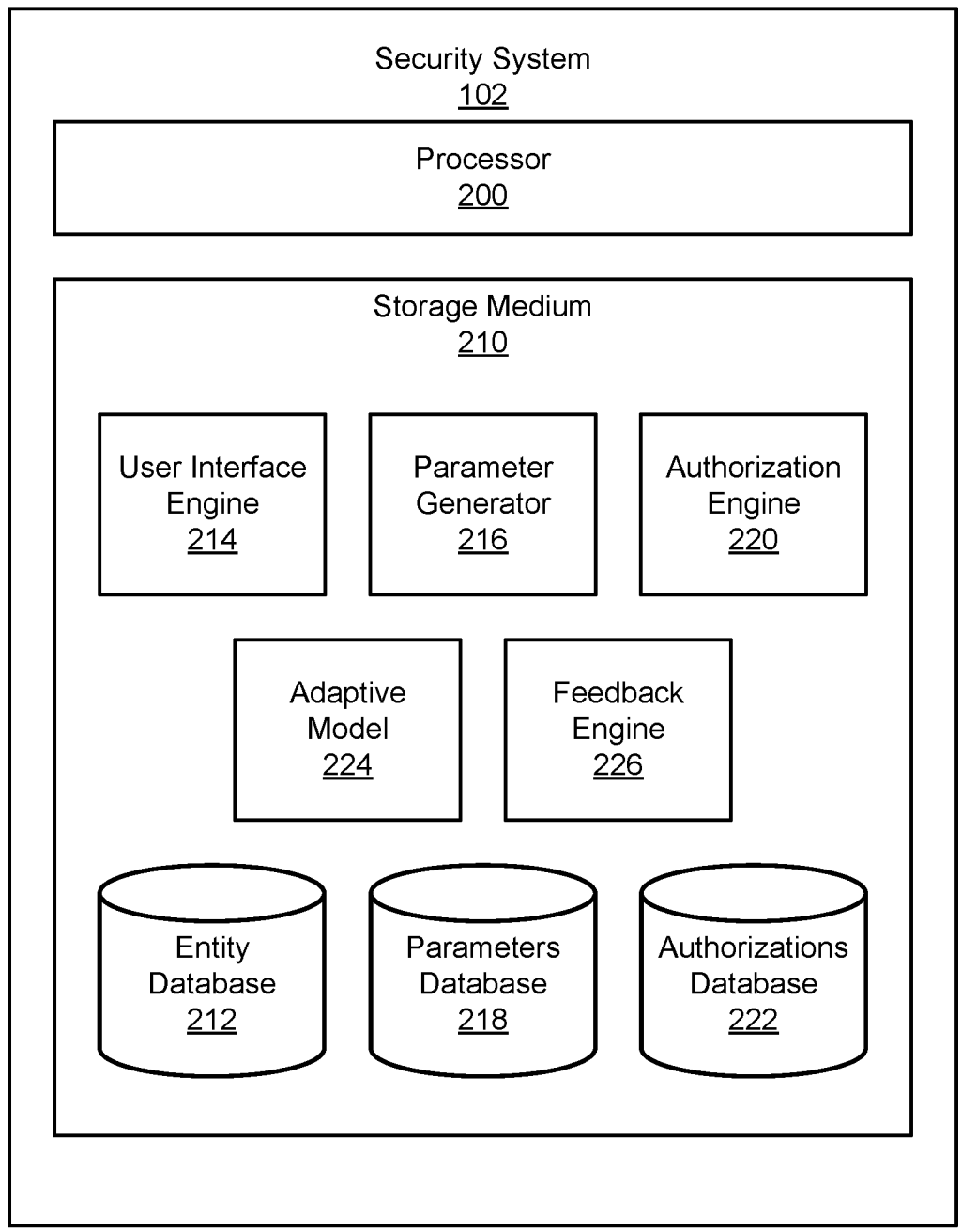
FIG. 2 illustrates a block diagram of a security system including an adaptive model for authorizing entities to access data objects in accordance with one embodiment.

FIG. 2 illustrates a block diagram of a security system 102 including an adaptive model for authorizing entities to access data objects in accordance with one embodiment. The security system 102 includes a processor 200 for manipulating and processing data, and a storage medium 210 for storing data and program instructions associated with various modules. In one example embodiment, the storage medium 210 comprises a non-transitory computer-readable storage medium. Various executable programs are each embodied as computer-executable instructions stored to the non-transitory computer-readable storage medium 210. The instructions when executed by the processor 200 cause the security system 102 to perform the functions attributed to the programs described herein. Further detail of an example computer system corresponding to the security system 102 is described below with reference to FIG. 6. The storage medium 210 includes an entity database 212, user interface engine 214, parameter generator 216, parameter database 218, authorization engine 220, authorizations database 222, adaptive model 224, and feedback engine 226. Alternative embodiments may include different or additional modules or omit one or more of the illustrated modules.

The entity database 212 stores information corresponding to entities that may be provided with authorization to interact with data objects, or that may provide authorization to other entities. As described herein, an entity may represent a user, system (e.g., a particular set of one or more client devices 120 or servers), or service (e.g., database processing system or cloud services), among other types or combinations of entities. The entity database 212 may receive and store information describing the entities (e.g., identification information, demographic information, geographical location, employer information, etc.).

In some embodiments, the entity database 212 stores user accounts of users or entities that have the authority to provide authorizations to other entities. In particular, the user account may include user information describing the users, e.g., associated organization, login credentials, or scope of the authority to provide authorizations. As an example use case, a user account of a user who is a data owner or database administrator includes employee information indicating that the user works for a research lab, a username and password for the user to interact with the security system 102 by logging in via a client device 120, and security information indicating that the user may provide or update authorizations for one or more subsets of employees of the research lab (e.g., teams associated with science, engineering, business, human resources, marketing, or security operations). The security information may indicate that the user is a trusted authority, e.g., having database administrator privileges. A trusted authority may delegate authorization granting privileges to another user. In addition, a user account may include a log of actions performed by the corresponding user, for example, authorizations manually granted to an entity, authorizations removed or changed for an entity, as well as accepted or rejected recommendations to update (e.g., add, remove, or change) an authorization of an entity.

The user interface engine 214 generates user interfaces for updating authorizations using the security system 102. In particular, the user interface engine 214 may provide user interfaces for display via a client application executing on a client device 120 of a user. Based on user input received from the user using the client device 120, the security system 102 may update authorizations for entities to interact with data objects. Further, the user interfaces may include recommendations generated by the security system 102. In an embodiment, the recommendations suggest that the user may intend to add, remove, or change an authorization for a given entity. Example user interfaces are described in further detail with reference to FIGS. 3A-B.

The parameter generator 216 parameterizes entities based on information from the entity database 212. In some embodiments, the parameter generator 216 generates parameters describing one or more entities and may store the parameters in the parameter database 218 or another database connected to the security system 102. Parameters may indicate, for example, a type of an entity, a geographical location or region of the entity, whether the entity interacted or is otherwise associated with another entity (e.g., collaborating on a joint project), operations performed by the entity, information describing users included in the entity, compliance training of entities (e.g., data protections may be reliant upon continued compliance training for adaptive security), among other types of information. In some embodiments, a parameter may not necessarily be provided by a database or a user (e.g., data owner or database administrator). Rather, the security system 102 may compute the parameter using the parameter generator 216 and/or the adaptive model 224. For example, the security system 102 may extrapolate meaning between two data objects that is not explicitly defined, but should (or could) be defined, and can update information automatically to make such relationship explicit. As an example use case, the parameter generator 216 determines relationships between employees or an organization using employee data that does not explicitly indicate which employees are co-workers or managers (e.g., pairwise relationships). Based on the relationships, the security system 102 may update or modify a database structure storing the employee data to reflect an organizational chart of the employees.

The authorization engine 220 generates and manages authorizations for entities to interact with data objects. The authorization engine 220 may generate authorizations based on user input manually provided by users. Further, the authorization engine 220 may also generate authorizations (or change or remove existing authorizations) based on recommendations. The authorization engine 220 generates recommendations responsive to determining that a user likely intends to provide authorization for an entity to access a data object. Moreover, the authorization engine 220 uses likelihoods determined by the adaptive model 224. The authorization engine 220 may store authorizations or update authorizations in the authorizations database 220. In some embodiments, the authorization engine 220 stores authorizations in a data record associated with a particular data object of the authorizations database 220. Thus, the authorization engine 220 may update authorizations for a data object by updating the associated data record, rather than having to update records associated with each entity previously authorized to interact with the data object.

For instance, over the course of a research project, different scientists and lab technicians join and leave the research team. Since the authorizations are stored in the authorizations database 220 on a per-data object basis (e.g., instead of a per-user basis), the authorization engine 220 may dynamically update authorizations for a specific data object in response to changes in the entities currently included in the research team. As another example, a given data object requires a confidential security clearance to access. An entity may receive clearance to access the given data object at a first point in time, but may lose the clearance at a second and subsequent point in time. Accordingly, the authorization engine 220 does not provide the entity with authorization to access the data object responsive to determining that the entity no longer has the confidential security clearance.

In some embodiments, the authorization engine 220 manages authorizations for entities to interact with data objects of another system outside of the DPMS 100. The authorization engine 220 may use an application programming interface (API) to communicate with an external source (e.g., a third party system) for providing an entity with access to a data object, responsive to determining that the entity is authorized to access the data object. The authorization engine 220 may request access to the data object from the external source and provide the accessed data object to the entity. Further, the security system 102 may export authorization rules for users in advance (or on a periodic basis) from external sources and store the data objects in a cache memory of the DPMS 100, e.g., to improve runtime speed or to provide a backup copy of data objects. In other embodiments, the authorization engine 220 may provide the entity with access to a data object without the authorization engine 220 (or the DPMS 100) itself accessing the data object.

The adaptive model 224 learns to predict user intent regarding changes in data security. In an example embodiment, the adaptive model 224 includes a set of expressions for determining authorizations of entities to interact with data objects. An expression may be a discrete machine readable expression that encodes human intent, as determined by the adaptive model 224 based on express user intent according to authorizations manually input by users of the security system 102. In other words, an expression may communicate one or more "rules of use" for a data object. The adaptive model 224 may discover or generate expressions by combining portions or rules of other expressions. Expressions may be backwards compatible across different versions of a DPMS 100 or other systems. The adaptive model 224 applies parameters (e.g., provided by the authorization engine 220) or common parameters to one or more of the expressions to determine predictions of intents of users.

For instance, the adaptive model 224 receives parameters (e.g., determined by the parameter generator 216) describing multiple entities that currently have authorization to access a given data object. The adaptive model 224 processes the parameters to generate one or more common parameters describing the multiple entities (e.g., at least two of the entities). A common parameter may be associated with one of the existing parameters. For instance, each of the multiple entities has a "San Francisco" parameter indicating that the corresponding entity is located in the city of San Francisco, and thus the common parameter is "San Francisco." Additionally, the adaptive model 224 may determine latent properties in the parameters of the multiple entities for generating new common parameters. In a different example, a first entity has a "San Jose" parameter and a second entity has a "Mountain View" parameter. The adaptive model 224 generates the common parameter "California" because the cities of San Jose and Mountain View are both located in the state of California. In some embodiments, the adaptive model 224 uses machine learning techniques to determine latent properties in training data. Example methods include set theory, term frequency, cardinality analysis, Jaccard similarity, tokenization, among other suitable techniques.

In some embodiments, the adaptive model 224 generates expressions based on extracted features of training data (e.g., previous authorizations or determined parameters of entities) or common parameters. The training data may be a set of parameters initially provided by a user for the adaptive model 224 to analyze. A usage expression may include one or more conditions or Boolean logic (e.g., AND, OR, NOR, XOR, NOT, etc.) for determining authorizations. In some embodiments, the "NOT" operation may be restricted to prevent circumvention of conditions. For example, a usage expression is ["Located in California" AND "Employee of Company X"]. Thus, the adaptive model 224 determines that an entity, having parameters indicating that the entity is located in San Francisco and works as a scientist at Company X, should be authorized to access a data object associated with the usage expression.

In some embodiments, the adaptive model 224 applies parameters or common parameters to one or more usage expressions to determine a likelihood that a user intends to provide authorization to an entity. The likelihood may be based on a number of common parameters associated with the entity, or a level of similarity between parameters of the entity and parameters of a usage expression. For instance, the adaptive model 224 determines a greater likelihood of user's intention to provide authorization to the entity responsive to determining that the entity includes greater than a threshold number or ratio of common parameters corresponding to the usage expression. A value of the likelihood may scale linearly or non-linearly according to a number of common parameters between entities. In some embodiments, the adaptive model 224 uses a weighted average to calculate the likelihood. The adaptive model 224 may weigh certain factors (e.g., types of common parameters or similar attributes between entities) more heavily than other factors. For example, the adaptive model 224 determines a greater weight for a common parameter indicating job function or organization than for another common parameter indicating demographic information (e.g., age or gender).

As another example using location-based parameters, the adaptive model 224 determines that parameter "New York" is more similar to parameter "New Jersey" than parameter "California," because New York is more proximate to New Jersey than California. In some embodiments, the adaptive model 224 may determine the likelihood based on the distance between locations associated with parameters. For instance, the parameters may indicate different office locations of an employer. Referring to the location-based parameters example above, a first, second, and third entity of the employer are located at a New Jersey, New York, and California office. The likelihood that the second entity should have access to a data object of the first entity may be greater than the likelihood of the third entity having access to the same data object, e.g., because the first and second entities are geographically more proximate to each other relative to the third entity.

The feedback engine 226 generates feedback based on authorizations of the security system 102. For example, the feedback indicates a percentage of users out of a given population of users (e.g., in a certain geographic location) that have access to a certain data object. The percentage of users may be specified based on a category of users such as information technology, human resources, engineering, business, or executive. Additionally, the feedback may indicate a percentage of users who have completed training, received certifications, or based on other suitable attributes of entities. In some embodiments, the feedback engine 226 provides feedback indicating why a given entity does not have access and generates information that may assist the entity in obtaining access. For instance, the feedback includes a set of trainings or certifications that the entity needs to receive before being authorized to access particular data objects. The feedback engine 226 may pivot between presenting feedbacks based different types of attributes. The feedback engine 226 may also process telematics data received from client devices 120. For instance, the feedback engine 226 determines a geographical location of a client device 120 based on a current or previous IP address, GPS sensor data, or network information of the client device 120. Thus, the feedback engine 226 may use geographical location information to generate feedback, e.g., a map of entities authorized to access a data object.

Example User Interfaces of Security System

FIGS. 3A-3B illustrate example user interface layouts corresponding to generated user interfaces in response to application of change corresponding to data security through the adaptive model 224 in accordance with various embodiments. Components of the security system 102 such as the interface engine 214 may generate the user interfaces.

In the embodiment shown in FIG. 3A, the user interface 300 illustrates an example whitelist composition of users of an organization. The feedback engine 226 may generate the feedback regarding authorizations of entities (e.g., the users of the organization) for presentation in the user interface. In the embodiment shown in FIG. 3A, the user interface includes a graphical depiction of "users by organization" and "coverage by organization." The "users by organization" section indicates a number of users in each of the computer science, service management, and systems engineering organizations that have authorization to access a given data object or are members of a group (e.g., authorized to access certain data objects). Additionally, the "coverage by organization" section indicates a percentage of users in each of the above organizations that are authorized to access the given data object or are members of the group.

In the embodiment shown in FIG. 3B, the user interface 310 illustrates user inputs and recommendations for authorizations. The rules section of the user interface 310 displays a "people rule" type of rule of use (e.g., usage expression) for a given data object based on certain parameters, e.g., a status indicator "status_ind," organization unit "org_unit," and primary site (e.g., geographical) "primary_site." For instance, the rule of use is represented using Boolean logic as "(status_ind='A' AND 'org_unit_IT' AND primary_site='NJ USA')." In other words, the rule indicates that entities that should be authorized to access the given data object are users who have a status indicator of "A," an organization unit of information technology (IT), and a primary site of New Jersey (NJ) USA. The user interface 310 also includes a user input (e.g., a button) for a user to manually add other rules of use or authorizations for entities to access data objects.

As shown in FIG. 3B, the user interface 310 also includes a suggestions section of recommendations determined by the security system 102. In particular, the adaptive model 224 recommends people from related organizations (e.g., computer science and service management), people from related departments (e.g., applied technology), and people from related sites (e.g., New York). Further, the suggestions section may indicate a number of people (e.g., entities) corresponding to each of the recommendations. The security system 102 may update an existing rule or add new rules based on user input. For example, responsive to receiving input indicating that a user accepted the suggestion to add people from the computer science organization unit, the security system 102 may update the example rule shown in FIG. 3B to include at least " . . . org_unit='IT' OR 'Computer Science . . . ." In some embodiments, a given recommendation may indicate why the security system 102 determined to provide the given recommendation. For example, the recommendation includes one or more common parameters between multiple entities, or includes a human-readable representation of a rule of use or usage expression used by the adaptive model 224 to determine the prediction for the given recommendation. In some embodiments, the user interface may include a list of multiple recommendations, and the user interface engine 214 may order the list for presentation. For instance, recommendations with a greater likelihood are presented toward the top of the list.

Example Process Flows

FIG. 4 illustrates a process flow 400 to determine authorization to access data for additional entities through the adaptive model 224 in accordance with one embodiment. The security system 102 receives 402 input data from a client device 120 of a user to provide authorization to entities to access a data object. The authorization engine 220 updates 404 an authorization database record (or database record) of the security system 102 (e.g., the authorizations database 222) to authorize the entities to access the data object. The authorization database record may be associated with the data object. The parameter generator 216 generates 406 parameters describing the entities. The authorization engine 220 transmits 408 the parameters to a model (e.g., the adaptive model 224) to determine a likelihood corresponding to an intent of the user to provide authorization to a given entity to access the data object. The model includes a set of expressions for determining authorizations of entities to access data objects based on common parameters describing the entities. The user interface engine 214 transmits 410, responsive to determining (e.g., by the authorization engine 220) that the likelihood is greater than a threshold value, a recommendation from the security system 102 to the client device 120 for presentation to the user. The recommendation suggests that the user may intend to update the authorization database record to authorize the given entity to access the data object.

In another embodiment, the security system 102 may use multiple thresholds. For instance, responsive to the authorization engine 220 determining that the likelihood is greater than a first threshold value, the authorization engine 220 automatically updates the authorization database record to authorize the given entity to access the given data object. The user interface engine 214 may also transmit an indication to the client device 120 that the given entity has been provided authorization to access the given data object. Additionally, responsive to the authorization engine 220 determining that the likelihood is less than or equal to the first threshold value, and greater than a second threshold value, the authorization engine 220 generates a recommendation for the authorization. The first threshold value may be greater than the second threshold value, for example, based on different confidence levels of the predicted likelihood determined by the adaptive model 224. In an embodiment, the security system 102 receives user input indicating a rejection of the model's prediction to provide authorization for a given entity. Thus, the authorization engine 220 may update corresponding authorization database record to remove the authorization in response to receiving the rejection.

Figure 5:
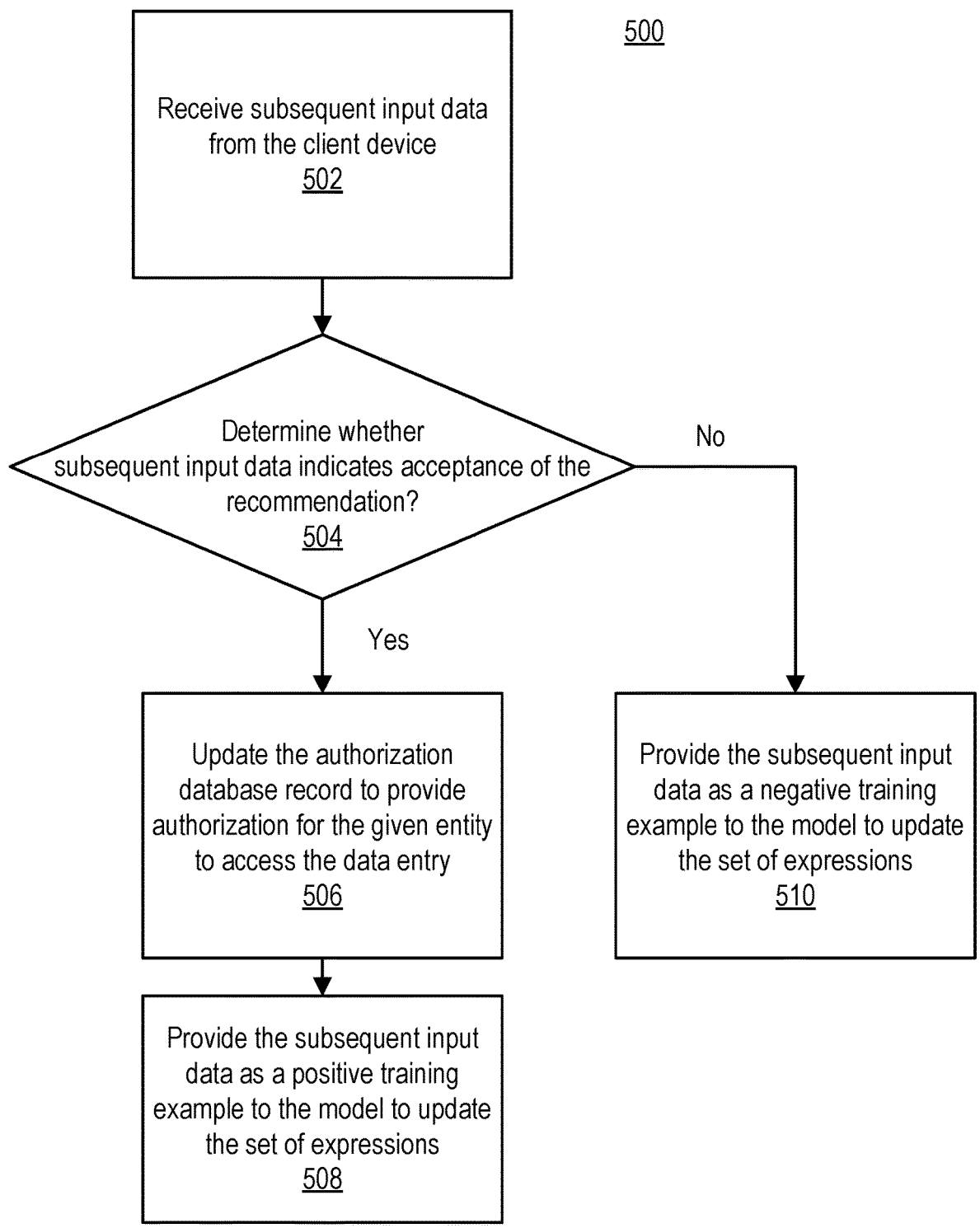
FIG. 5 illustrates a feedback process flow for predictions of the adaptive model in accordance with one embodiment.

FIG. 5 illustrates a feedback process flow 500 for predictions of the adaptive model 224 in accordance with one embodiment. In some embodiments, the security system 102 performs the feedback process flow 500 following the process flow 400 shown in FIG. 4.

The user interface engine 214 receives 502 subsequent input data from the client device 120, e.g., responsive to transmitting the recommendation for providing authorization to the given entity to access the data object. The authorization engine 220 determines 504 whether the subsequent input data indicates that the user accepts or rejects the recommendation. Responsive to determining that the subsequent input data indicates an acceptance of the recommendation, the authorization engine 220 updates 506 the authorization database record to provide authorization to the given entity to access the data object. Optionally, the authorization engine 220 may provide 508 the subsequent input data as a positive training example to update the set of expressions. On the other hand, responsive to determining that the subsequent input data indicates a rejection of the recommendation, the authorization engine 220 may provide 510 the subsequent input data as a negative training example to update the set of expressions. By using user input acceptances or rejections of recommendations, the authorization engine 220 may periodically re-train the adaptive model 224 such that the adaptive model 224 learns to determine more accurate predictions over time. In particular, training data may reinforce usage expressions that correspond to accepted recommendations and modify other usage expressions that correspond to rejected recommendations.

Physical Components

Figure 6:
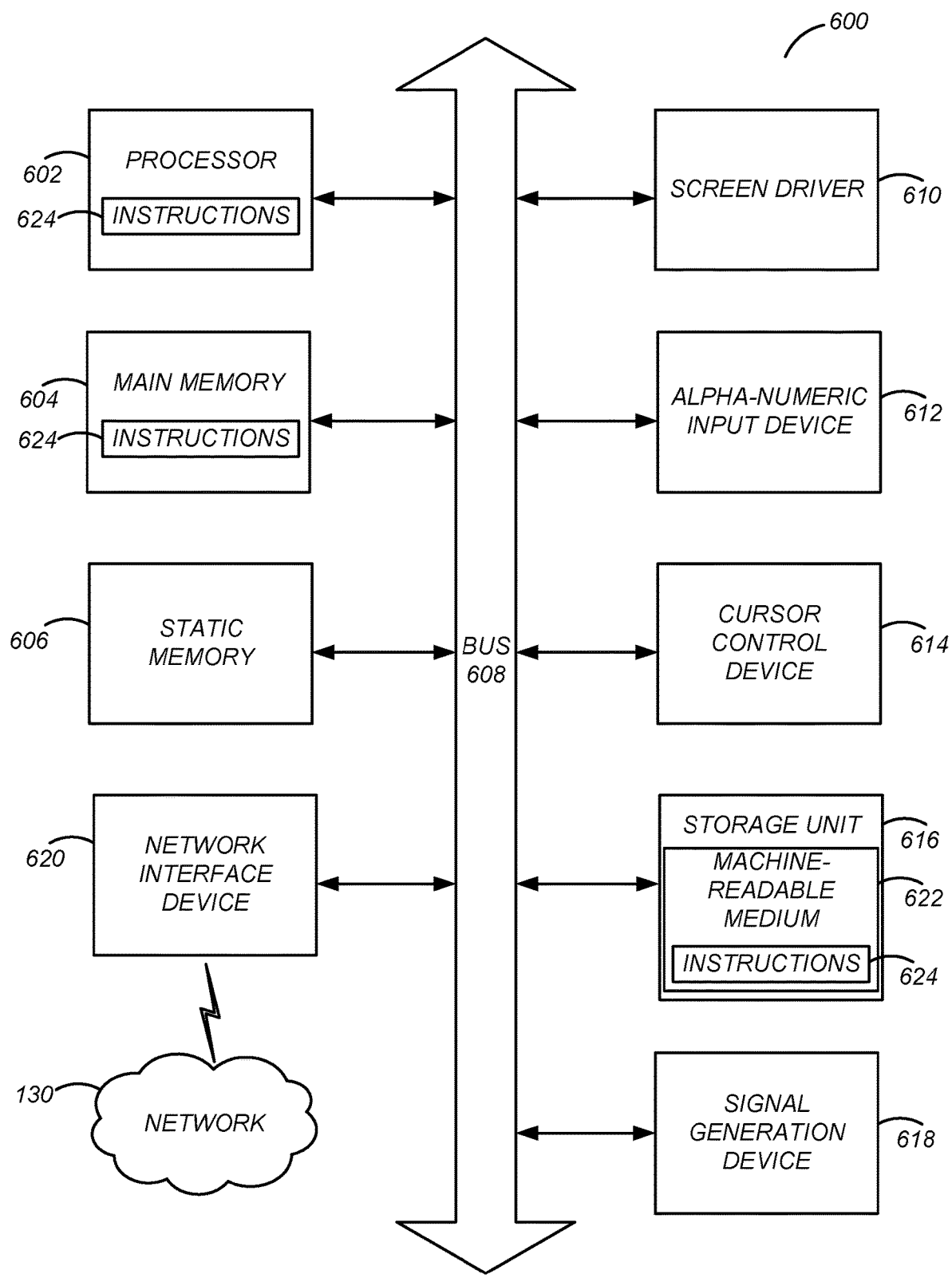
FIG. 6 is a block diagram illustrating components of an example machine able to read instructions from a machine-readable medium and execute them in one or more processors (or controllers) in accordance with one embodiment.

FIG. 6 is a block diagram illustrating components of an example machine able to read instructions from a machine-readable medium and execute them in one or more processors (or controllers) in accordance with one embodiment. The instructions may correspond to the processes, for example, described in FIGS. 4 and 5. The instructions also may correspond to the components/modules carrying out the functionality disclosed in FIGS. 1-3.

Specifically, FIG. 6 shows a diagrammatic representation of an example form of a computer system 600. The computer system 600 can be used to execute instructions 624 (e.g., program code or software) for causing the machine to perform any one or more of the methodologies (or processes) described herein, for example, in FIGS. 1-5. The machine may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein. In addition, it is noted that not all the components noted in FIG. 6 may be necessary for a machine to be configured to execute the systems and/or processes described within the disclosure.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The disclosed configuration provides benefits and advantages that include, for example, determining which entities should have access to certain data objects through complex, multi-part rules that are made simple and understandable to data owners, data users, and database administrators. Additional benefits and advantages may include improving security by ensuring that entities who should have access to data objects are provided authorization to do so in a timely manner. Moreover, entities who should not have authorization (or who have authorization that has lapsed or been removed) are prevented from accessing the data objects. Thus, in example use cases, these advantages may enable more rapid drug development or treatments while maintaining control over data security and privacy.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1A-B and 2. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 200 or processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for adaptive access control of data objects that may be executed through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for adaptive access control of data objects, the method comprising:
   receiving, by a security system, input data from a client device of a user to provide authorization to a plurality of entities to access a data object;
   updating an authorization database record of the security system to authorize the plurality of entities to access the data object, the authorization database record associated with the data object;
   generating parameters describing the plurality of entities;
   transmitting the parameters to a model to determine a first likelihood corresponding to an intent of the user to provide authorization to a given entity to access the data object, the model including a set of expressions encoding intents of the user for determining authorizations of a plurality of users to access data objects based on common parameters describing the plurality of users, wherein the model generates the set of expressions based at least in part on a first parameter indicating that the user is an owner of a database including the data object;

determining, by the model, a confident prediction of the intent of the user to provide authorization to the given entity to access the data object responsive to determining that the first likelihood is greater than a first threshold value;

transmitting, responsive to determining the confident prediction of the intent of the user, a first recommendation from the security system to the client device for presentation, the first recommendation for updating the authorization database record to authorize the given entity to access the data object;

determining a modification of a second parameter describing the given entity;

determining, by the model, a second likelihood that the user intends to remove the authorization from the given entity to access the data object responsive to determining the modification of the second parameter;

transmitting, responsive to determining that the second likelihood is greater than a second threshold value, a second recommendation from the security system to the client device for display to the user, the second recommendation suggesting to the user to update the authorization database record to remove the authorization of the given entity to access the data object.

2. The method of claim 1, further comprising:
receiving subsequent input data from the client device; and
updating, responsive to determining that the subsequent input data indicates an acceptance of the recommendation, the authorization database record to authorize the given entity to access the data object.

3. The method of claim 1, further comprising:
receiving subsequent input data from the client device; and
retraining, responsive to determining that the subsequent input data indicates a rejection of the recommendation, the model using the subsequent input data as feedback.

4. The method of claim 1, further comprising:
determining a current location of a given client device of the given entity based on sensor data received from the given client device; and
determining the modification of the second parameter by determining that the current location is outside of a geographical domain.

5. The method of claim 1, further comprising:
generating a parameter describing the data object by parsing content of the data object, the parameter transmitted along with the parameters to the model to determine the first likelihood that the user intends to provide the authorization to the given entity to access the data object.

6. The method of claim 1, wherein the model generates the set of expressions based at least in part on a level of reliability of the user.

7. The method of claim 1, further comprising:
determining, by the model using an expression of the set of expressions and the parameters, another likelihood that the user intends to provide authorization to the given entity to access another data object associated with another authorization database record; and transmitting, responsive to determining that the other likelihood is greater than another threshold value, another recommendation from the security system to the client device for presentation, the other recommendation for updating the other authorization database record to authorize the given entity to access the other data object.

8. The method of claim 1, further comprising:
displaying, by the client device to the user, the second recommendation suggesting to the user to update the authorization database record to remove the authorization of the given entity to access the data object, wherein the second recommendation does not remove the authorization of the given entity to access the data object; and
updating, responsive to determining that the user inputs an acceptance of the second recommendation, the authorization database record to remove the authorization of the given entity to access the data object.

9. A method for adaptive access control of data objects, the method comprising:
receiving, by a security system, input data from a client device of a user to provide authorization to a plurality of entities to access a first data object;
updating an authorization database record of the security system to authorize the plurality of entities to access the first data object, the authorization database record associated with the first data object;
generating parameters describing the plurality of entities;
transmitting the parameters to a model to determine a first likelihood corresponding to a first intent of the user to provide authorization to a given entity to access the first data object, the model including a set of expressions encoding intents of the user for determining authorizations of a plurality of users to access data objects based on common parameters describing the plurality of users, wherein the model generates the set of expressions based at least in part on a first parameter indicating that the user is an owner of a database including the first data object;
determining, by the model, a confident prediction of the first intent of the user to provide authorization to the given entity to access the first data object responsive to determining that the first likelihood is greater than a first threshold value;
updating, responsive to determining the confident prediction of the first intent of the user, the authorization database record to authorize the given entity to access the first data object;
determining a modification of a second parameter describing the given entity;
determining, by the model, a second likelihood that the user intends to remove the authorization from the given entity to access the data object responsive to determining the modification of the second parameter; and
transmitting, responsive to determining that the second likelihood is greater than a second threshold value, a recommendation from the security system to the client device for display to the user, the recommendation suggesting to the user to update the authorization database record to remove the authorization of the given entity to access the data object.

10. The method of claim 9, further comprising:
determining a third likelihood corresponding to a second intent of the user to provide authorization to the given entity to access a second data object; and transmitting, responsive to determining that the third likelihood is greater than a second threshold value and less than or equal to the first threshold value, a recommendation from the security system to the client device for presentation, the recommendation for authorizing the given entity to access the second data object.

11. The method of claim 9, further comprising:
transmitting, from the security system to the client device, an indication that the given entity is provided authorization to access the first data object;
receiving subsequent input data from the client device responsive to the indication; and
updating, responsive to determining that the subsequent input data indicates a rejection of authorization for the given entity to access the first data object, the authorization database record to remove the authorization.

12. The method of claim 9, further comprising:
generating a parameter describing the first data object by parsing content of the first data object, the parameter transmitted along with the parameters to the model to determine the first likelihood that the user intends to provide the authorization to the given entity to access the first data object.

13. A non-transitory computer-readable storage medium storing instructions for adaptive access control of data objects, the instructions when executed by one or more processors cause the one or more processors to perform steps including:
receiving, by a security system, input data from a client device of a user to provide authorization to a plurality of entities to access a data object;
updating an authorization database record of the security system to authorize the plurality of entities to access the data object, the authorization database record associated with the data object;
generating parameters describing the plurality of entities;
transmitting the parameters to a model to determine a first likelihood corresponding to an intent of the user to provide authorization to a given entity to access the data object, the model including a set of expressions encoding intents of the user for determining authorizations of a plurality of users to access data objects based on common parameters describing the plurality of users, wherein the model generates the set of expressions based at least in part on a first parameter indicating that the user is an owner of a database including the data object;
determining, by the model, a confident prediction of the intent of the user to provide authorization to the given entity to access the data object responsive to determining that the first likelihood is greater than a first threshold value;
transmitting, responsive to determining the confident prediction of the intent of the user, a first recommendation from the security system to the client device for presentation, the first recommendation for updating the authorization database record to authorize the given entity to access the data object;
determining a modification of a second parameter describing the given entity;
determining, by the model, a second likelihood that the user intends to remove the authorization from the given entity to access the data object responsive to determining the modification of the second parameter; and
transmitting, responsive to determining that the second likelihood is greater than a second threshold value, a second recommendation from the security system to the client device for display to the user, the second recommendation suggesting to the user to update the authorization database record to remove the authorization of the given entity to access the data object.

14. The non-transitory computer-readable storage medium of claim 13, having further instructions that when executed by the one or more processors cause the one or more processors to perform further steps including:
receiving subsequent input data from the client device; and
updating, responsive to determining that the subsequent input data indicates an acceptance of the recommendation, the authorization database record to authorize the given entity to access the data object.

15. The non-transitory computer-readable storage medium of claim 13, having further instructions that when executed by the one or more processors cause the one or more processors to perform further steps including:
receiving subsequent input data from the client device; and
retraining, responsive to determining that the subsequent input data indicates a rejection of the recommendation, the model using the subsequent input data as feedback.

16. The non-transitory computer-readable storage medium of claim 13, having further instructions that when executed by the one or more processors cause the one or more processors to perform further steps including:
determining a current location of a given client device of the given entity based on sensor data received from the given client device; and
determining the modification of the second parameter by determining that the current location is outside of a geographical domain.

17. The non-transitory computer-readable storage medium of claim 13, having further instructions that when executed by the one or more processors cause the one or more processors to perform further steps including:
generating a parameter describing the data object by parsing content of the data object, the parameter transmitted along with the parameters to the model to determine the first likelihood that the user intends to provide the authorization to the given entity to access the data object.

18. The non-transitory computer-readable storage medium of claim 13, wherein the model generates the set of expressions based at least in part on a level of reliability of the user.

19. The non-transitory computer-readable storage medium of claim 13, having further instructions that when executed by the one or more processors cause the one or more processors to perform further steps including:
determining, by the model using an expression of the set of expressions and the parameters, another likelihood that the user intends to provide authorization to the given entity to access another data object associated with another authorization database record; and
transmitting, responsive to determining that the other likelihood is greater than another threshold value, another recommendation from the security system to the client device for presentation, the other recommendation for updating the other authorization database record to authorize the given entity to access the other data object.

* * * * *